United States Patent [19]

Hsueh et al.

[11] 4,360,234

[45] Nov. 23, 1982

[54] IN-SITU METHOD AND APPARATUS FOR SPARGING GAS BUBBLES

[75] Inventors: Limin Hsueh, Bedford; Robert A. Hard, Still River; Donald H. Davidson, Bedford; Ray V. Huff, Acton, all of Mass.

[73] Assignee: Kennecott Copper Corporation, New York, N.Y.

[21] Appl. No.: 724,549

[22] Filed: Sep. 20, 1976

[51] Int. Cl.³ .............................. E21B 43/28; 299 4;5
[52] U.S. Cl. .......................................... 299/5; 137/13; 137/896; 261/122
[58] Field of Search ................. 137/13, 604; 261/122, 261/104, 107, DIG. 75

[56] References Cited

U.S. PATENT DOCUMENTS

| | | | |
|---|---|---|---|
| 2,519,618 | 8/1950 | Wilson et al. | 261/DIG. 54 |
| 3,118,958 | 1/1964 | White | 261/122 X |
| 3,307,567 | 3/1967 | Gogarty et al. | 137/13 |
| 3,545,731 | 12/1970 | McManus | 261/122 |
| 3,554,228 | 1/1971 | Schneider | 137/894 X |
| 3,652,229 | 3/1972 | Burke | 261/122 X |
| 3,708,206 | 1/1973 | Hard | 299/5 |
| 3,730,276 | 5/1973 | Land | 137/13 |
| 3,744,510 | 7/1973 | Fletcher et al. | 137/896 X |

Primary Examiner—William F. Pate, III
Attorney, Agent, or Firm—John L. Sniado; Anthony M. Lorusso

[57] ABSTRACT

Method and apparatus for introducing finely divided gas bubbles into a lixiviant used for in-situ mining of minerals containing metal values, such as copper values. The lixiviant is supplied to a plurality of porous tubes formed of sintered powdered metal while a gas is supplied under pressure about the tubes to cause the gas to penetrate into the interior of the tubes in the form of fine bubbles which are wiped from the interior of the tubes by the lixiviant passing therethrough.

The method and apparatus can be advantageously employed in situations where it is desirable to perform in-situ mining with an oxidizing lixiviant. In these cases oxygen is supplied under pressure about the tubes.

9 Claims, 5 Drawing Figures

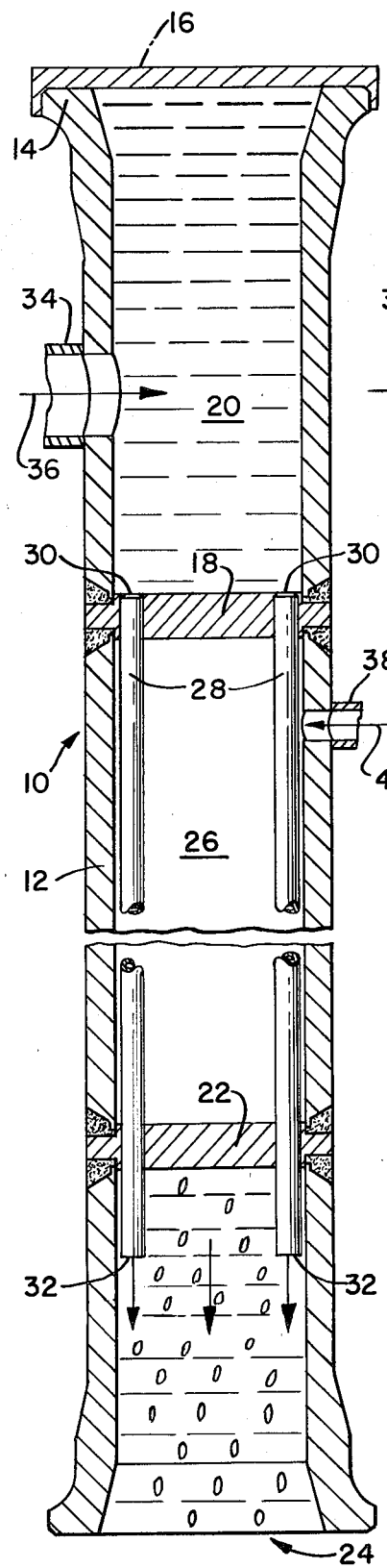
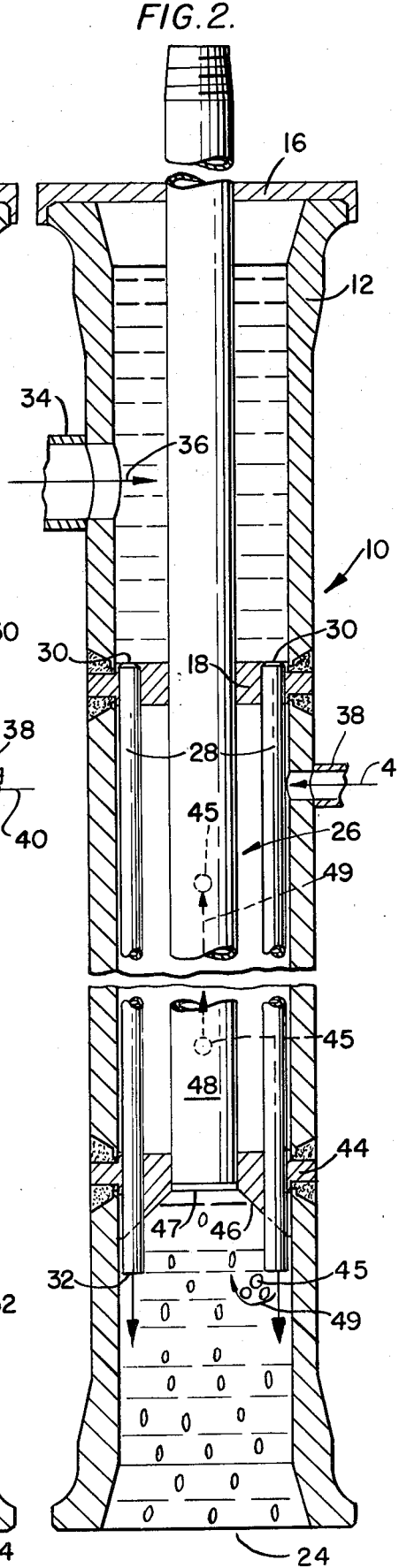
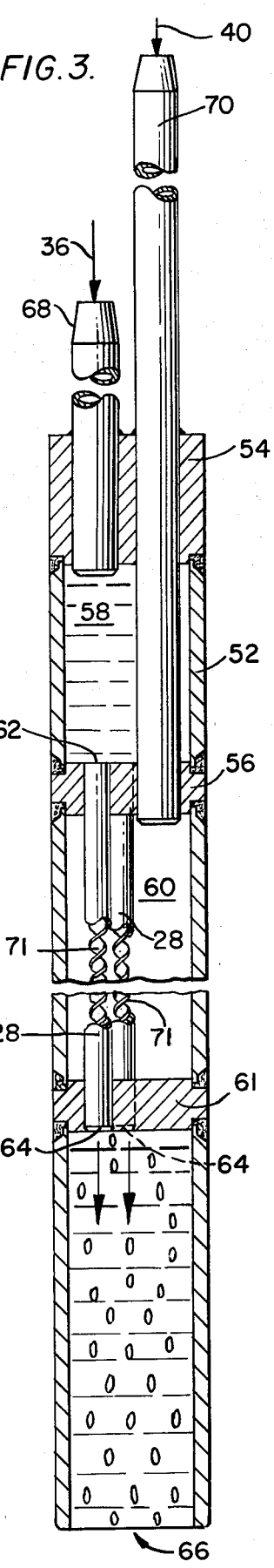

IN-SITU METHOD AND APPARATUS FOR SPARGING GAS BUBBLES

BACKGROUND OF THE INVENTION

The present invention relates to in-situ mining of metals such as copper and, more particularly, to a gas sparging method and apparatus for introducing fine bubbles of gas into the lixiviant or leaching liquor, used in such mining processes. The invention can be employed to a great advantage in situations where a gaseous oxidant is required to solubilize metal values.

The recovery of copper and other metals by conventional procedures, such as open pit mining and underground tunneling, has in recent years, become more costly and time consuming. For these reasons, and also because of the increasing demand for copper, other methods of copper recovery have been sought. As a result, it is now feasible to recover copper, even at great depths, by various in-situ mining techniques.

In such in-situ mining operations, a well is drilled to the level of the recoverable metal values. A liquid lixiviant, such as for example, ammonia-ammonium sulfate or ferric sulphate is then supplied through the well bore to the ore formation wherein it reacts with the metal values in the ore formation to produce a pregnant liquor containing the metal values therein. This pregnant liquor is then withdrawn from the ore formation through the same well bore, or through a series of closely spaced bores surrounding a central well bore, by pumping, or through a gas lift operation. A variety of such in-situ mining techniques are known in the art.

In many in-situ mining techniques it is advantageous to introduce a gas, such as oxygen, into the lixiviant supplied to the well bore. In many systems, a gas cooperates with the lixiviant to improve the leaching of the metal values from the ore formation. Usually an oxidizing gas such as air, oxygen, or air enriched with oxygen is used. This gas may also be supplemented with a catalyst such as $SO_2$, or an acid forming gas such as $SO_3$. An important example of a system in which a lixiviant containing bubbles of gas is used to leach metals is the so called "oxygen-water" system.

It has been found that the size of the gas bubbles introduced into the lixiviant will aid in the removal of metal values from the ore formation; and, it is desirable to supply the gas in the form of a large quantity of extremely fine or small diameter bubbles.

Accordingly, it is an object of the present invention to provide a method and apparatus for supplying fine bubbles to a lixiviant solution which is to be used in in-situ mining operations.

Another object of the present invention is to provide an apparatus for forming fine bubbles in a lixiviant solution which is relatively simple and inexpensive in construction.

Yet another object of the present invention is to provide a process for in-situ mining of minerals containing metal values such as copper values, by supplying a lixiviant to a plurality of sintered powdered metal porous tubes and supplying a gas to the exterior of these tubes, under pressure, so that the gas penetrates into the interior of the tubes and is wiped therefrom as fine bubbles by the lixiviant passing through the tubes.

Yet another object of the present invention is to provide an apparatus for introducing finely divided gas bubbles into a lixiviant used for in-situ mining of minerals which includes a hollow casing having first and second separate chambers formed therein with the lixiviant being supplied to the first chamber and gas under pressure supplied to the second chamber which also contains a plurality of porous tubes formed of sintered powdered metal, each having one end in communication with the first chamber so that the lixiviant flows through the tubes while gas penetrates into the tubes to form fine bubbles which are wiped from the tubes by the lixiviant and intermixed therewith.

SUMMARY OF THE INVENTION

In accordance with one important embodiment of the present invention, a gas sparging unit is provided which is formed from a sleeve or casing having two separate chambers formed therein. One of the chambers, a first chamber, has an inlet opening through which liquid lixiviant is supplied under pressure. The other of the chambers, a second chamber, has a plurality of porous tubes formed of sintered metal powder mounted therein, with one end of the tubes communicating with the first chamber of the sleeve so that liquid lixiviant from the first chamber is supplied through the tubes. The opposite ends of the tubes extend from the second chamber and open adjacent an outlet opening in the surrounding sleeve. The second chamber of the sleeve has an inlet opening formed therein through which the gas to be used is supplied under pressure. The pressurized gas flows through the sintered metal powder porous tubes to the interior of the tubes and forms small bubbles therein. These bubbles are sheared from the interior of the tubes by the barren lixiviant flowing therethrough.

It has been found that by increasing the velocity of the lixiviant flow through the tubes, the diameter of the bubbles formed in the sintered metal powder porous tubes can be varied and controlled.

The gas sparging unit can be connected to a well pipe above the surface of the ore formation; or, in another embodiment of the invention, it can be inserted down the well bore near the ore formation to supply the liquid lixiviant and intermixed gas bubbles to the ore.

BRIEF DESCRIPTION OF THE DRAWING

FIG. 1 is a longitudinal sectional view of a gas sparging unit constructed in accordance with the present invention, which unit is adapted to be used above the surface of the ore formation;

FIG. 2 is a longitudinal sectional view similar to FIG. 1 of a surface gas sparging unit, constructed in accordance with another embodiment of the present invention;

FIG. 3 is a longitudinal sectional view, similar to FIG. 1, of a gas sparging unit constructed in accordance with another embodiment of the present invention, which unit is adapted to be inserted down the well bore below the ground;

DESCRIPTION OF THE PREFERRED EMBODIMENTS

Figure 4:
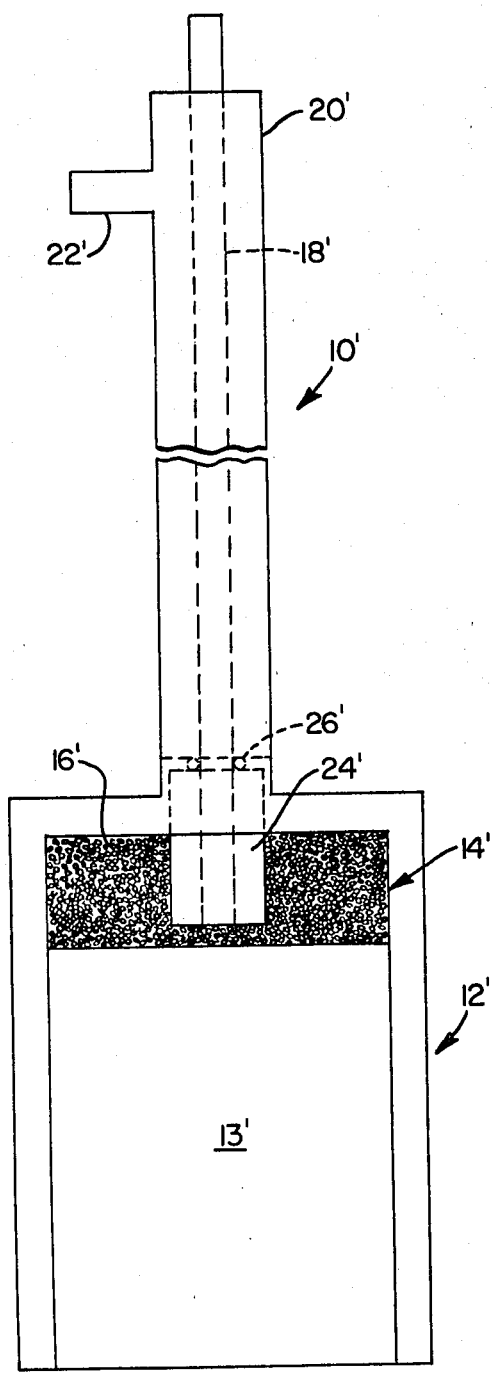
FIG. 4 is a schematic representation of laboratory apparatus for measuring the bubble size of two phase lixiviant formulations; and, FIG. 5 is a schematic diagram showing laboratory apparatus for testing the stability, under various conditions, of two phase lixiviants.
Figure 5:
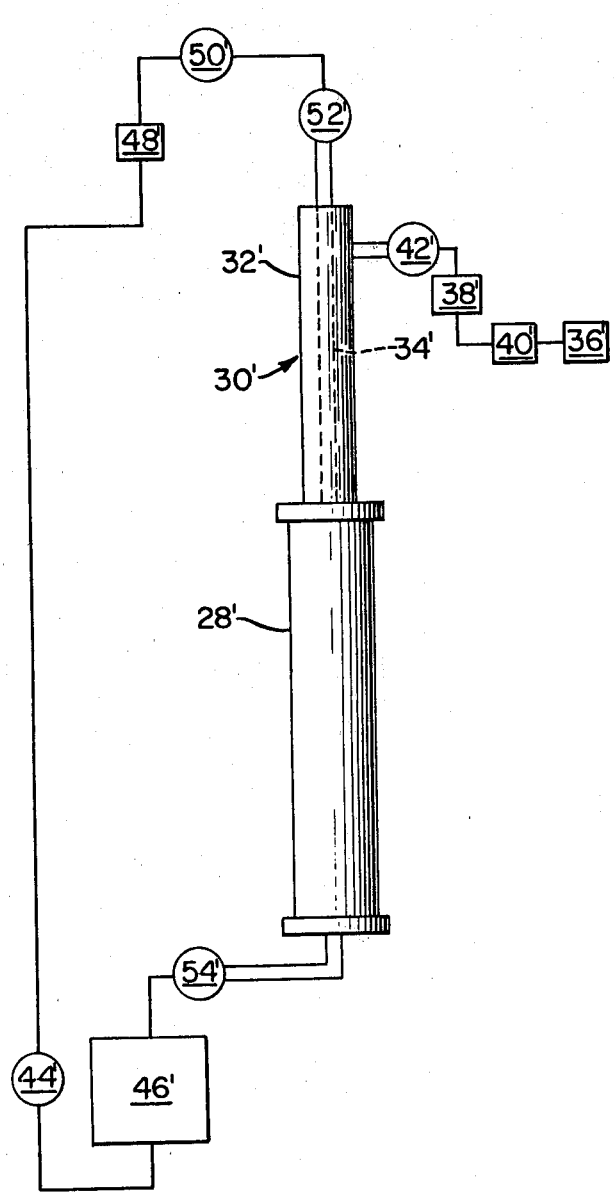

Referring now to the drawing in detail, and more particularly to FIG. 1, a gas sparging unit 10, constructed in accordance with the present invention, is illustrated which consists of a generally cylindrical casing 12 formed from a plurality of annular members which are welded together to form an elongated cylindrical sleeve. The sleeve is closed at one end 14 in any convenient manner, as for example by a flanged cap 16 or the like, and has a first partition plate 18 welded therein in order to define a first chamber 20 within the sleeve. The partition plate 18 is a generally circular member which extends entirely across the internal diameter of sleeve 12. A second similar partition member 22 is located adjacent the opposite end 24 of the sleeve (which defines an outlet end for the sparging unit) so as to define a second chamber 26 within the sparging unit.

A plurality of hollow elongated tubes 28 are mounted in the partitions 18, 22 with one end 30 of each of the tubes 28 located in communication with the interior of chamber 20. The other ends 32 of the tubes 28 extend through the partition 22, adjacent the outlet opening 24 of the sleeve. These tubes are preferably formed of a sintered metal powder porous material having micro pores of a diameter of, for example, 50 microns, to permit small gas bubbles to be diffused therethrough. A general useful range of pore diameter is from 2 microns to 1000 microns. A preferred range is from 10 to 100 microns. Such tubes may be formed of stainless steel or similar metallic material.

The porous sintered tubes are commercially available from Newmet, Inc., Pequabuck, Conn. The size of the pores in a tube is controlled by selecting proper particle size distribution of stainless steel powder and by sintering at a temperature slightly below the melting point of the stainless steel powder.

The number of such tubes used in a particular gas sparger unit can be varied as desired in accordance with the amount of gas bubbles required to be introduced into the lixiviant solution and the type of ore formation being treated as described hereinafter.

The first chamber 20 of the gas sparging unit 10 includes an inlet opening 34 through which a lixiviant under pressure, such as for example, ammonia and ammonium sulfate or ferric sulphate, is supplied from a source as is shown by arrow 36. Any convenient pumping apparatus can be utilized to supply the lixiviant from the source to the first chamber 20 of the gas sparging unit.

The second chamber 26, formed in the sleeve 12, includes an inlet opening 38. The gas to be introduced into the lixiviant solution is supplied through the inlet 38 under pressure from a source as is shown by arrow 40, in any convenient manner.

In the typical in-situ mining operation, the gas supplied will be an oxidizing gas such as air, oxygen, oxygen enriched air, or a combination of oxygen and some catalyst, such as for example $SO_2$ or $SO_3$, as an acid forming gas. By suppling gas under pressure in this manner to the chamber 26, the gas is forced to penetrate through the porous tubes 28 in order to form small bubbles on the interior surfaces of the tubes. Since the upper ends 30 of the tubes are in communication with the chamber 20, the liquid lixiviant supplied to that chamber will flow through the tubes into contact with the small bubbles formed therein. The movement of the lixiviant through the tubes towards the discharge ends 32 thereof will wipe the bubbles from the interior surfaces of the tube and cause the bubbles to be intermixed within the lixiviant.

It has been found that the greater the velocity at which the barren lixiviant moves through the tubes, the smaller the bubbles introduced into the lixiviant will be. Generally the proper velocity of lixiviant in a tube can be calculated from the amount and pressure of introduced lixiviant. Fluid velocity ranges from 2 ft/sec. to 50 ft/sec. have been found satisfactory when porous tubes of $\frac{1}{4}''$ inside diameter are used. The size of the bubbles can also be varied or controlled by using porous tubes of varying diameters at a fixed flow. In this connection tubes having inside diameters of between about $\frac{1}{8}''$ and $\frac{1}{2}''$ have been found satisfactory when the tubes have pores with diameters ranging between 10 to 100 microns and with lixiviant velocities between 2 ft/sec. to 50 ft/sec.

The lixiviant solution thus mixed with the fine gas bubbles passes through the discharge openings 32 of the tubes 28 to the discharge end 24 of the gas sparger unit.

In the embodiment of the invention shown in FIG. 1, the gas sparging unit is adapted to be used above the ground. Accordingly, the end 24 may be connected in any convenient manner, as for example by an elbow joint, to the well pipe which extends down the well bore. In this embodiment, lixiviant mixed with gas bubbles passes down the well pipe to the ore formation to treat the metal values in the ore formation and create a pregnant liquor, in accordance with known processes. As mentioned, the present invention is employed in situations where the introduction of fine gas bubbles into the lixiviant improves the chemical process which leaches the metal values of the ore formation.

Another embodiment of the invention is illustrated in FIG. 2 of the drawing. This embodiment of the invention is substantially the same as that illustrated in FIG. 1, and also is intended to be used as a surface sparging unit, i.e., it is used above the ground and the combined mixture of lixiviant and fine bubbles is supplied to the well pipe from the discharge end 24 of the sparging unit above the ground level. Typically these sparging units are arranged in a vertical position so that the tubes 28 therein extend vertically.

In the embodiment illustrated in FIG. 2, the elements which correspond to like elements in the embodiment of FIG. 1 have been identified with the same reference numerals. In this embodiment of the invention, however, the second chamber 26 is formed between the partition 18 and a partition 44 which has a generally conically shaped surface 46 downstream of the chamber 26. This partition is also generally circular in configuration and extends completely across the entire internal diameter of the sleeve 12 and receives the ends 32 of the sintered metal powder porous tubes 28. In addition, partition 44 receives the end 47 of a hollow vent tube or conduit 48. This conduit extends through the partition 18 in a gas and liquid tight seal to the exterior of the sparging unit through the cap 16. The vent tube 48 and the conically shaped partition 44 allow large diameter gas bubbles to escape from the sparging unit. That is, it may happen that during the operation of the device, bubbles 45 are formed in the lixiviant solution, as it is discharged from the tubes 28, which have a diameter, and thus a buoyance, which is so large as to prevent the bubbles from moving downstream with the lixiviant solution into the ore formation. Such bubbles 45 then will rise vertically in the sleeve 12 as is shown by arrow 49 and can escape from the sparging unit through conduit 48. Again, it is noted that the sparging unit is normally used in a vertical position so that the bubbles can rise vertically through tube 48.

The embodiment of the invention illustrated in FIG. 3 is particularly adapted to be used in the well bore itself. This embodiment of the invention includes a sleeve 52 which is also formed from a plurality of cylindrical elements welded together. This sleeve is closed in a fluid tight seal at its upper end by a cap 54 and includes an intermediate partition 56 which, with cap 54, defines an internal first chamber 58 within the sleeve. A second partion 61 is located downstream of the partition 56, and cooperates therewith to define a second chamber 60 in the sparging unit. A plurality of sintered metal powder porous tubes 28 are mounted in the second chamber 60 with their upper ends 62 extending into the partition 56 and into communication with the chamber 58. The lower ends 64 of the tubes 28 extend through the partition 61 and into communication with the discharge end 66 of the sleeve 52. All of the joints between the sleeve 52, the partitions 56, 61 and the tubes 28 are formed to be liquid and gas tight, as for example by welding.

Liquid lixiviant under pressure is supplied to the first chamber 58 of the gas sparging unit in this embodiment of the invention through a conduit 68 from a source of lixiviant, in the same manner as described above with respect to the embodiment of FIG. 1. Thus, the liquid lixiviant can flow through the opened ends 62 of the tubes 28 through the tubes to the discharge end 66 of the sparger unit.

Gas is supplied to the second chamber 60 through a tube or conduit 70 which extends, in liquid tight relation, through the cap 54 and the partition 56. The gas is supplied through the conduit from a source thereof in any convenient manner.

The embodiment of the invention shown in FIG. 3 operates in substantially the same manner as the previously described embodiments in that the pressurized gas supplied to the chamber 60 is caused to penetrate through the porous tubes 28 in order to form small bubbles on the inner surface of the tubes which are wiped from the tubes by lixiviant flowing therethrough. In this manner the fine bubbles are introduced into the lixiviant and discharged therewith through the discharge end 66 of the sparging unit.

As mentioned, this sparging unit is intended to be used in the well bore itself, and is dropped down the well bore in any convenient manner. Of course, the conduits 68, 70 are connected to other conduits (not shown) which extend up the well bore to the surface where the sources of gas and lixiviant are located. The diameter of the generally cylindrical sleeve 52 is, in this embodiment, formed to fit within the predrilled well bore, so that the unit can be readily lowered down the bore hole to the desired elevation for treatment of the ore formation.

In one embodiment, for example, the sparger unit of FIG. 3 may have an outside diameter of approximately 2" and a length of approximately 40". The porous tubes, which may range for example from between 3 to 8 tubes, typically will have an outside diameter of 0.420" and an inside diameter of 0.250" while their length may be for example 31".

EXAMPLE I

A gas sparger unit was constructed from 8 pieces of sintered stainless steel tube each with a 0.25" ID, a 0.42" OD, and a 15" length. The tubes had pores with average diameters of 40 microns. The casing was made of 4", schedule 120, stainless steel 316 pipe. The unit was pretested and found to produce gas bubbles with diameters in the range of 0.1–0.3 mm.

The unit was shipped to a test site in Safford, Ariz. At the test site in Safford, Ariz. the copper ore body is mainly in the form of chalcopyrite lying at a depth of 2000–4000 ft. below the ground. The average copper grade was estimated to be 0.5%. An ammoniacal solution (3 M ammonium nitrate and 1 M ammonia) was injected at a rate of 10 gallons per minute and gaseous oxygen at a rate of 12 standard cubic feet per minute into a well (well #149A) at the interval of 3200–3300 ft.

The solution was recovered in a separated well (well 190 SA-2), 70 ft. away from the injection well. The solution was produced at 10 gallons per minute. The copper concentration in the produced solution was up to 1.2 g/l.

At this point it should be noted that the sparger of the present invention can be used to great advantage in the processes as set forth in U.S. patent application Ser. No. 724,548 entitled In-Situ Mining Method and Apparatus, filed on even date herewith and U.S. patent application Ser. No. 724,547 entitled Improvements in In-Situ Mining of Copper and Nickel also filed on even date herewith. The teachings of the aforementioned copending patent application are hereby incorporated herein by reference.

As is set forth in U.S. patent application Ser. No. 724,547, the efficiency of the sparger of the present invention can be increased by utilizing a surfactant in the lixiviant.

A further modification of the process and apparatus of the present invention is inclusion of a twisted stainless steel strap 71 (see FIG. 3) having one spiral per inch within the porous tubes 28. The spiral is designed to create an angular velocity component in addition to the longitudinal velocity component.

In order to evaluate the effect of the surfactant as well as the effect of the spiral 71, a series of tests were conducted.

Referring to FIG. 4, laboratory apparatus for producing two-phase lixiviants and for measuring the size of bubbles dispersed therein is shown. The apparatus consists of a sparger 10' and a bubble viewer of 12'. The viewer 12' comprises a clear plastic case, 0.25 inches in depth, 2.25 inches wide and 6 inches high. The outlet of the viewer 12' (not shown) is partially submerged in a beaker full of water which keeps the viewer full of fluid during experimentation. The upper portion 14' of the viewer 12' contains a layer 16' of glass beads which reduces vortex formation while the viewer of the apparatus is filled with a lixiviant.

The sparger comprises a one quarter inch inside diameter sintered stainless steel porous tube 18', enclosed by pipe 20' which may be filled with pressurized gas through gas inlet 22'. A PVC plug 24' sealed to the bottom of pipe 20' by an O-ring 26' serves as an airtight connection between sparger 10' and viewer 12'.

In use, the apparatus is filled with liquid, and water or ammoniated water is introduced through the top of porous tube 18' at a given flow rate. Gas (nitrogen, air, oxygen, or oxygen enriched air) is introduced through gas inlet 22' under pressure and thereby forced through the porous walls of tube 18'. The gas may also include various gaseous oxidants comprising acid forming gases such as $SO_2$, $SO_3$, or $NO_2$. The gas bubbles produced within the tube 18' are then sheared from the interior walls of tube 18' and carried through plug 24' and glass beads 16' into the viewing area 13' of viewer 12' by the liquid flow. Using this procedure and apparatus, it is possible to study the effects of various parameters on the bubble size and stability of lixiviants produced, e.g., the effect of the gas flow rate, liquid flow rate, inclusion of the spiral, and the inclusion of various additives combined with the liquid phase of the lixiviants. The object of the experiments was to produce a stable, two-phase lixiviant which could be delivered to the leaching interval of an in-situ mine at a reasonable flow rate without phase separation. In this regard, it has been discovered that the success of such lixiviants in in-situ mining techniques depends on the size of the gas bubbles being generally about 10–100 microns.

The size of a single gas bubble, in general, can be determined quite easily from its ascending velocity in a fluid of known viscosity. However, the apparatus of FIG. 4 was developed since there was no established method for measuring the size of large numbers of gas bubbles in a fluid. The size of bubbles present in the viewing area 13' of the apparatus of FIG. 4 may be easily determined if a photograph is taken of viewing area 13'. The photographic method was employed because it was both direct and simple.

From a series of experiments on various lixiviants produced using the apparatus of FIG. 4, a lixiviant has been developed which makes the in-situ mining of the type described above more efficient. Specifically, the addition of an effective amount of one or more surfactants to the aqueous phase of the two-phase lixiviants produced enabled the production of bubbles of the desired size range and substantially reduced coalescence of bubbles. With a surfactant, the size of the bubbles are within the range of 0.1 to 0.5 mm (lixiviant at atmospheric pressure). Without a surfactant, two-phase lixiviants produced under identical conditions have a bubble size range of 1.0 to 1.5 mm. In short, the addition of the surfactant yields a 3 to 15 times improvement in gas bubble size distribution in the low pressure simulator of FIG. 4. These results have been observed to be reproducible and even improved upon in commercial embodiments of the lixiviant production apparatus of the type described in the aforementioned U.S. application Ser. Nos. 724,548 and 724,547. Furthermore, some attempts at in-situ mining operations which failed when conventional two-phase lixiviants were employed because of the formation of debilitating gas pockets, were rendered successful by using the modified process of the instant invention employing the surfactant stabilized lixiviant.

With conventional two phase lixiviants, the minimum liquid downward velocity of the lixiviant is about one foot per second. At slower velocities, pockets of gas tend to form and the upward rise of the bubbles exceeds the downward flow of the liquid. However, the addition of as little as 25 parts per million surfactant in the lixiviant reduces the minimum downward velocity of the liquid phase by a factor between about 3 and 5.

It is preferred that the lixiviant also contain an agent which enhances the stabilization of Ca++ ions in solution since these are often found together with the metal values of interest. The use of such an agent, however, is conventional in the oil drilling art to inhibit scale formation. A suitable Ca++ ion stabilizer in Calnox ® which is a sodium polyacrylate sold by the Atlas Powder Co. In general, other sodium polyacrylates can be used as scale inhibitors. It should be noted that the inclusion of an agent such as Calnox ® in the lixiviant is not considered to be a part of the invention.

The amount of surfactant added per volume of liquid phase of the lixiviant will vary with the particular surfactant used. Successful lixiviant compositions have been made which include only 25 ppm Dowfax ® and mixtures of 25 ppm Dowfax ® with 75 ppm Calnox ®. As an additional bubble coalescent inhibitor, aluminium ions in the form of 1–2 grams per liter $Al_2(SO_4)_3$ has been found to be effective.

The advantages and features of the process of the invention will be further understood from the following examples, which in no event should be construed as limiting.

EXAMPLE A

Effect of Liquid Velocity in Porous Tube

Experiments were carried out with a constant gas flow rate of 700 standard cubic centimeters per minute (SCCM) for various liquid flow rates. At high flow rate-low gas volume fraction, the gas is well dispersed in solution. As the liquid flow rate decreases, the volume fraction of gas increases and the flow gradually changes from bubbly flow to slug flow, i.e., large amoebalike bubbles are formed. As the liquid flow rate is decreased, there is a "transition" where large agglomerated gas bubbles are formed having a non-spherical shape in excess of 5 ml in size.

The estimated bubble size, as a function of linear velocity in the porous tube and as measured by photographic methods using the apparatus of FIG. 4, is given in Tables 1 through 3. It is abundantly clear that the greater the liquid velocity, the smaller the gas bubble size range.

TABLE 1

| Estimated Bubble Size, No Surfactant, With Spiral | | | | |
|---|---|---|---|---|
| Run # | Liq flow rate (GPM) | linear velocity (ft/sec) | gas volume fraction % | Bubble Sizes (mm) |
| 424-1 | 4.8 | 31.4 | 3.7 | 0.5–1.5 |
| -2 | 3.15 | 20.6 | 5.5 | 1.0–1.5 |
| -3 | 2.2 | 14.4 | 7.7 | 2.0–5.0 Transition |
| 427-16 | 3.75 | 24.5 | 4.7 | 0.5–1.5 |
| -17 | 3.15 | 20.6 | 5.5 | 1.0–2.5 |
| -18 | 2.48 | 16.2 | 6.9 | 1.0–3.0 |
| -19 | 2.2 | 14.4 | 7.7 | 2.0–5.0 Transition |

TABLE 2

| Estimated Bubble Size, With Dowfax ®, No Spiral In Porous Tube | | | | |
|---|---|---|---|---|
| Run # | Liq flow rate (GPM) | linear velocity (ft/sec) | gas volume fraction % | Bubble Sizes (mm) |
| 419-1 | 3.65 | 23.9 | 4.8 | 0.1–0.5 |
| -2 | 4.05 | 26.5 | 4.4 | 0.1–0.5 |
| -3 | 3.15 | 20.5 | 5.5 | 0.1–0.5 |
| -4 | 2.65 | 17.3 | 3.8 | 0.2–0.6 |
| -5 | 2.15 | 14.1 | 7.9 | 0.25–1.0 |
| -6 | 1.8 | 11.8 | 9.3 | 0.2–2.0 |
| -7 | 1.6 | 10.5 | 10.4 | 0.2–3.0 |
| -8 | 1.5 | 9.8 | 11.0 | 0.2–4.0 Transition |

TABLE 3

Estimated Bubble Size, With Dowfax ®, With Spiral In Porous Tube

| Run # | Liq flow rate (GPM) | linear velocity (ft/sec) | gas volume fraction % | Bubble Sizes (mm) |
|---|---|---|---|---|
| 425-4 | 4.8 | 31.4 | 3.7 | 0.1–0.5 |
| -5 | 4.1 | 26.0 | 4.3 | 0.1–0.5 |
| -6 | 3.15 | 20.6 | 5.5 | 0.2–0.6 |
| -7 | 2.2 | 13.7 | 7.7 | 0.2–0.75 |
| -8 | 1.25 | 8.2 | 12.9 | 1–2.5 Transition |
| -9 | 0.60 | 3.9 | 23.5 | 2–5.0 |
| 426-11 | 3.75 | 24.5 | 4.7 | 0.1–0.5 |
| -13 | 3.15 | 20.6 | 5.5 | 0.2–0.6 |
| -14 | 2.2 | 14.4 | 7.7 | 0.3–0.75 |
| -15 | 1.25 | 8.17 | 12.9 | 0.5–2.0 Transition |

EXAMPLE B

The Effect of Surfactant Addition

As can be seen from a comparison of Tables 1 and 2 above, the bubble size range is significantly smaller in a lixiviant containing a surfactant versus a lixiviant without a surfactant. The bubble size range in lixiviants containing a surfactant, as exemplified by a comparison between the 3.5 gpm flow rate, are in the range of 0.1 to 0.5 mm, whereas, without a surfactant, the range is between 1.0 and 1.5 mm. It is estimated that the addition of an effective amount of surfactant reduces bubble size by a factor of 15.

EXAMPLE C

The Effect of Inclusion of a Spiral Strap

A twisted stainless steel strap having one spiral per inch was inserted into the interior of porous tube 18 to create an angular velocity component in addition to the longitudinal velocity component. By comparing the results disclosed in Table 2 with those of Table 3, it can be seen that the spiral can reduce the transition flow rate from 1.5 gpm to 1.25 gpm. However, no noticeable effect on bubble size was observed.

Accordingly, it will be seen that a relatively simple and inexpensive constructed gas sparging unit is provided which will enable gas bubbles of small diameter to be finely dispersed into a liquid lixiviant used in the ore treatment process. The dispersion of this gas in fine bubbles uniformly throughout the lixiviant substantially improves the recovery of metal values from an ore formation.

Although illustrative embodiments of the present invention have been described herein with reference to the accompanying drawings, it is to be understood that the invention is not limited to those precise embodiments, and that various changes and modifications may be effected therein without departing from the scope or spirit of the invention.

We claim:

1. A gas sparging unit for use in introducing finely divided gas bubbles into a lixiviant used for in-situ mining of minerals, said device comprising:
   a hollow casing having a first chamber formed therein into which liquid lixiviant is supplied, a second chamber isolated from said first chamber and an outlet end;
   a plurality of porous tubes formed of sintered powdered metal extending into said second chamber with said tubes having one end in fluid communication with said first chamber, said first chamber being isolated from said outlet end and with the down stream ends of said tubes being positioned so that lixiviant containing gas bubbles can pass through said outlet end;
   means for introducing a pressurized gas about the portion of said tubes in said second chamber to enable the gas to penetrate into said tubes so that the gas can be wiped from the interior of the tubes by the lixiviant flowing through the tubes to form a lixiviant containing finely divided bubbles; and
   means for removing gas bubbles trapped upstream of said outlet, said means comprising a conduit for providing communication between the interior of said casing adjacent the outlet end and the exterior of said casing.

2. The gas sparging unit as set forth in claim 1 wherein said casing comprises a generally vertically extending cylindrical sleeve with said first chamber and second chamber being located in axial alignment in said sleeve and with said conduit extending axially within said sleeve through said first and second chambers.

3. The gas sparging unit as set forth in claim 2 including a generally funnel shaped guide surface adjacent the outlet for guiding bubbles into the conduit.

4. A gas sparging unit for use in introducing finely divided gas bubbles into a lixiviant used for in-situ mining of minerals, said device comprising:
   a hollow casing having a first chamber formed therein into which liquid lixiviant is supplied and a second chamber isolated from said first chamber;
   a plurality of porous tubes formed of sintered powdered metal and having micropores with a diameter between the range of 2–1000 microns, said tubes extending into said second chamber with said tubes having one end in fluid communication with said first chamber;
   means for introducing a pressurized gas about the portion of said tubes in said second chamber to enable the gas to penetrate into said tubes so that the gas can be wiped from the interior of the tubes by the lixiviant flowing through the tubes to form a lixiviant containing finely divided bubbles;
   said casing having an outlet end with said first chamber being isolated from said outlet end and with downstream end of said tube being positioned so that lixiviant containing gas bubbles can pass through said outlet end; and,
   means for removing gas bubbles trapped upstream of said outlet, said means comprising a conduit for providing communication between the interior of said casing adjacent the outlet end and the exterior of said casing.

5. The gas sparging unit as set forth in claim 4 wherein said casing comprises a generally vertically extending cylindrical sleeve with said first chamber and second chamber being located in axial alignment in said sleeve and with said conduit extending axially within said sleeve through said first and second chambers.

6. The gas sparging unit as set forth in claim 5 including a generally funnel shaped guide surface adjacent the outlet for guiding bubbles into the conduit.

7. The gas sparging unit as set forth in claim 4 wherein said micropores have a diameter within the range of 10–100 microns.

8. The gas sparging unit as set forth in claim 5 wherein said micropores have a diameter within the range of 10–100 microns.

9. The gas sparging unit as set forth in claim 6 wherein said micropores have a diameter within the range of 10–100 microns.

* * * * *